(12) United States Patent
Stallkamp (10) Patent No.: US 7,581,016 B1
(45) Date of Patent: Aug. 25, 2009

(54) SYSTEM AND METHOD FOR AUTOMATIC MEDIA TRACK ROUTING

(75) Inventor: Rick Stallkamp, Tigard, OR (US)

(73) Assignee: Omneon Video Networks, Sunnyvale, CA (US)

( * ) Notice: Subject to any disclaimer, the term of this patent is extended or adjusted under 35 U.S.C. 154(b) by 849 days.

(21) Appl. No.: 11/107,697

(22) Filed: Apr. 14, 2005

(51) Int. Cl.
*G06F 15/16* (2006.01)
(52) U.S. Cl. .................. 709/231; 709/219; 370/231
(58) Field of Classification Search ................. 709/219, 709/231, 238
See application file for complete search history.

(56) References Cited

U.S. PATENT DOCUMENTS

| | | | | |
|---|---|---|---|---|
| 5,182,552 A | * | 1/1993 | Paynting | 340/825.25 |
| 5,634,124 A | * | 5/1997 | Khoyi et al. | 707/103 R |
| 6,091,725 A | * | 7/2000 | Cheriton et al. | 370/392 |
| 6,813,690 B1 | * | 11/2004 | Lango et al. | 711/118 |

| | | |
|---|---|---|
| 2003/0098926 A1 | 5/2003 | Jamie |
| 2006/0294570 A1 | 12/2006 | Kelly |
| 2007/0027682 A1 | 2/2007 | Bennett |

OTHER PUBLICATIONS

Anonymous, "Omneon TrackTool Datasheet," Omneon Video Networks, Inc., Nov. 2006, 2 pages.
Anonymous, "Omneon TrackTool Datasheet," Omneon Video Networks, Inc., Jan. 2005, 2 pages.
Anonymous, "Automatic Track Routing for Multi-Channel Broadcast White Paper," Omneon Video Networks, Inc., 2004, 10 pages.

* cited by examiner

*Primary Examiner*—Jeffrey Pwu
*Assistant Examiner*—Shripal K Khajuria
(74) *Attorney, Agent, or Firm*—Hickman Palermo Truong & Becker LLP (57) ABSTRACT

Embodiments of the invention are generally directed to a system and method for automatically routing a media track. In one embodiment, a system (e.g., a media server) automatically routes a media track to an output port of the system based on at least a partial match between a track identifier and a configurable output port label. The media track can be either an audio track or a video track.

18 Claims, 7 Drawing Sheets

SYSTEM AND METHOD FOR AUTOMATIC MEDIA TRACK ROUTING

TECHNICAL FIELD

Embodiments of the invention generally relate to the field of media track processing and, more particularly, to a system and method for automatic media track routing.

BACKGROUND

There are an increasing number of broadcasters that provide local language support for their programming. These broadcasters are often motivated by factors such as government mandates and competitive pressures to provide programs in local languages. The size of a broadcaster's potential audience and the viewer loyalty of that potential audience can be increased by providing programs in local languages.

Typically, local language support is implemented by adding a new language track to a media clip. The term "track" broadly refers to a collection of time-dependent data that is associated with a single media type. A media clip is a collection of one or more associated media tracks. The conventional approaches to adding a new language track to a media clip include the stacking approach and the program copy model.

The stacking approach refers to stacking two or more language tracks in a predefined order within a media clip. This approach usually involves sending a copy of the media clip to a dubbing house where a new audio track is created for each required language. The new audio tracks are then stacked into the media clip in a predefined order. The order in which the audio tracks are stacked determines the order in which the audio tracks are played during a broadcast. For this reason, the stacking order of the languages must be carefully managed to avoid confusion and errors. The management of the stacking order is typically a time-consuming process because the dubbing house must lay down a new audio track second-for-second against the video track and the broadcaster must then validate the stacking order.

The program copy model refers to making a separate copy of the media clip for each desired language. Like the stacking approach, the program copy model also typically involves sending a copy of the media clip to a dubbing house where a new audio track is created for each required language. Instead of stacking the new audio tracks in the media clip, however, a separate copy of the media clip is generated for each language. These separate copies of the media clip must be carefully managed to avoid broadcasting errors.

These two conventional approaches to adding a new language track to a media clip involve similar problems. They are both time-consuming because they typically include sending a copy of the media track to a dubbing house where new audio tracks are laid down second-for-second against the video track. In addition, the management of media clips is more complex because, in the case of the stacking approach, the stacking order must be managed, and, in the case of program copy model, multiple copies of the same program must be managed.

SUMMARY OF THE INVENTION

Embodiments of the invention are generally directed to a system and method for automatic media track routing. In an embodiment, a media server (or other system) locates a media clip stored in its file system. The media clip includes at least one media track and the media server selects a media track from the media clip based, at least in part, on a track identifier associated with the media track. The media server automatically routes the selected media track to an output port based on at least a partial match between the track identifier and a configurable output port label.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for automatic media track routing. In one embodiment, a system (e.g., a media server) automatically routes media tracks within a media clip to a specific output port (e.g., an audio or a video output port) by matching a track identifier embedded into the track with a configurable label assigned to the output port. The media track can be either an audio track or a video track. The correct media track (e.g., video track, language track, music bed, etc.) automatically plays out of the output port having the matching (or at least partly matching) configurable output port label. In an embodiment, no operator intervention is required to ensure that a media track is played on the appropriate output port.

Figure 1:
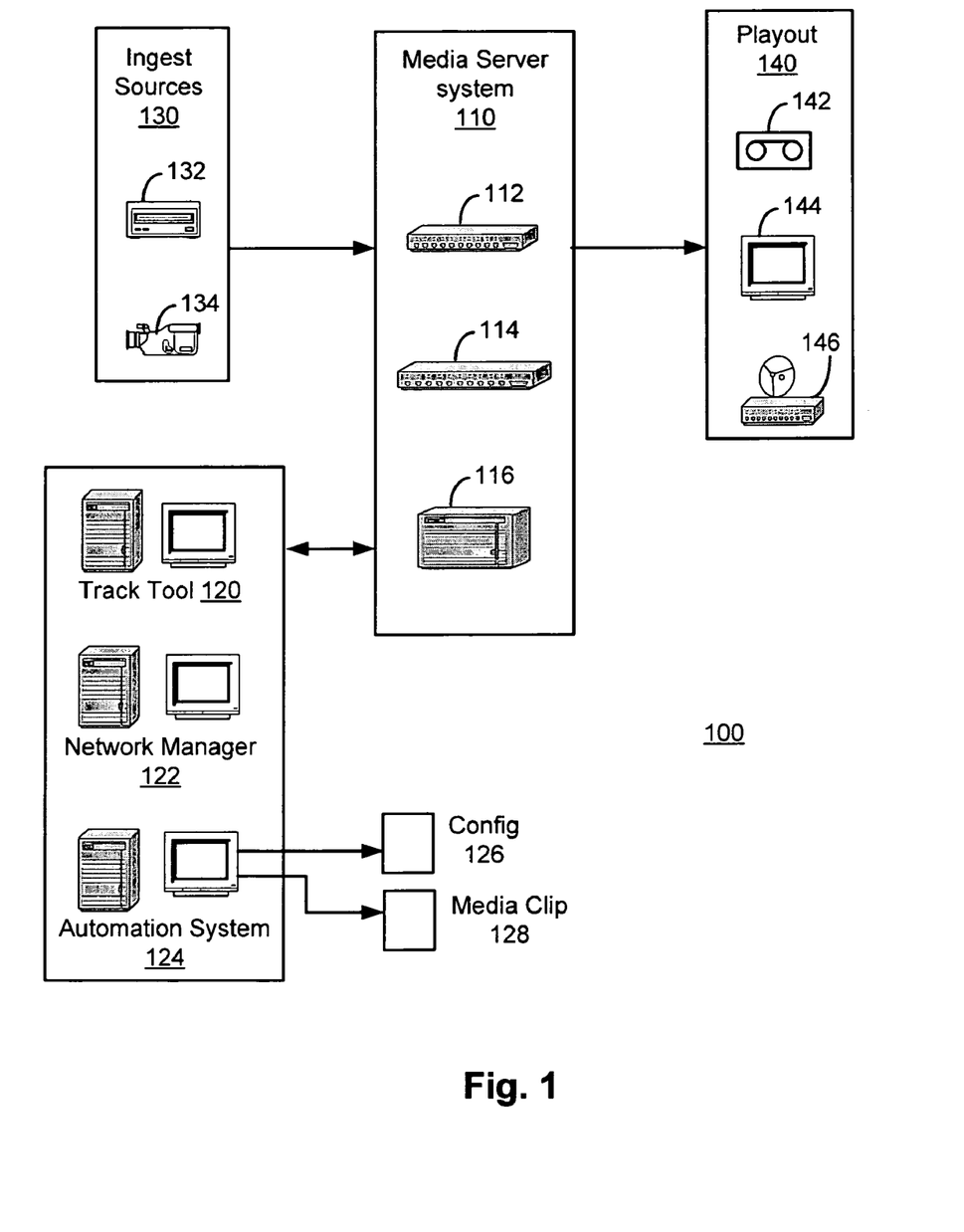
FIG. 1 is a functional block diagram of selected aspects of a media server system, implemented according to an embodiment of the invention.

FIG. 1 is a functional block diagram of selected aspects of a system 100, implemented according to an embodiment of the invention. System 100 includes media server system 110, track tool 120, network manager 122, automation system 124, ingest sources 130, and playout options 140. In an alternative embodiment, system 100 may include more elements, fewer elements, and/or different elements.

Media server system 110 is a computer system that receives, processes, and provides audiovisual programs. Media server system 110 may include specialized and/or general purpose hardware and software components. The illustrated embodiment of media server system 110 includes media input/output (I/O) ports 112, media server 114, and storage system 116. In an embodiment, the interconnection between media I/O ports 112 and media server 114 is through an industry standard high speed serial bus. The interconnection between media server 114 and storage system 116 is via multiple fibre channel loops. In an alternative embodiment, one or more of input/output (I/O) ports 112, media server 114, and storage system 116 may be interconnected by other means or integrated into a single device.

Media I/O ports component 112 contains the physical I/O devices used to input or output media to media server system 110. Media I/O ports component 112 includes one or more I/O ports. Each I/O port is responsible for a single channel of media. In one embodiment, the I/O ports are bi-direction and provide both record and playback capability. In an alternative embodiment, each I/O port is unidirectional and provides either a record or a playback capability.

Media server 114 is a core component of media server system 110. In one embodiment, the functions of media server 114 include: sending media packets to (or receiving media packets from) media I/O ports component 112; providing connectivity to other media servers (not shown); controlling access to storage system 116 (e.g., by acting as a Redundant Array of Independent Disks (RAID) controller); and acting as a file system controller. Storage system 116 provides non-volatile storage for media server 114. In one embodiment, storage system 116 includes one or more RAID sets that are, in turn, organized into a file system.

Ingest sources 130 provide media content to media server system 110 and can include a wide variety of media sources. Examples of an ingest source include audio/visual equipment 132, a direct feed from a camera 134 (and/or microphone), and the like. Playout options 140 deliver media content to consumers and can include a wide variety of playout options such as tape 142, display device 144, and satellite system 146.

In an embodiment, track tool 120 is a computing system that provides a mechanism for creating and managing media clips. For example, track tool 120 may enable a user to combine new tracks with a preexisting media clip. In one embodiment, track tool 120 includes a track identifier editor. The track identifier editor is a software tool that allows a user to access and configure metadata associated with a media clip (or a media track). As is further discussed below, the track identifier editor can be used to associate a media track identifier with a media track.

Network manager 122 is a computing system that facilitates management of media server system 110. For example, network manager 122 enables a user to configure media server system 110 and to monitor the status of various error conditions of media server system 110. In an embodiment, network manager 122 provides a tool to manage the configuration of media I/O ports 112. As is further discussed below, managing the configuration of media I/O ports 112 includes specifying one or more configurable output port labels for an output port of media I/O ports 112.

In an embodiment, automation system 124 is responsible for ensuring that media server system 110 plays the proper media clip at the appropriate time. For example, automation system 124 may receive a playlist as an input (either from a user or another system) and then load and play various media clips according to the playlist. During playout, automation system 124 either loads a media clip from storage system 116 or provides a media clip (e.g., medial clip 128) to media server 114. Automation system 124 may also provide configuration information 126 to specify one or more configuration output port labels. As is further described below, the automatic media track routing feature assists automation system 124 by ensuring that the proper media track is automatically played on the appropriate output port.

Figure 2:
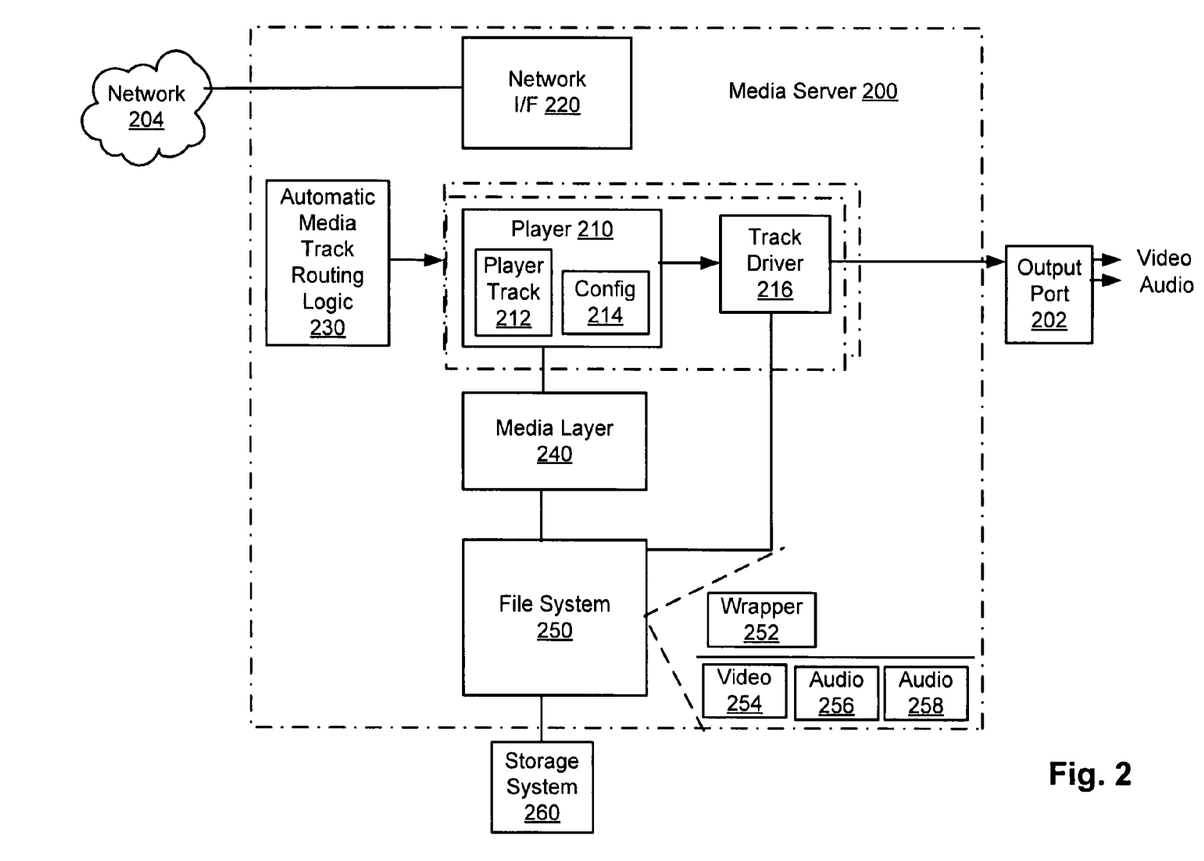
FIG. 2 is a functional block diagram of the logical architecture of a media server, implemented according to an embodiment of the invention.

FIG. 2 is a functional block diagram of the logical architecture of a media server, implemented according to an embodiment of the invention. Media server 200 includes player 210, network interface (I/F) 220, automatic media track routing logic 230, media layer 240, and file system 250.

In an alternative embodiment, media server 200 may have more elements, fewer elements, and/or different elements.

Player 210 controls the playout of media tracks on output port 202. Player 210 may be a software entity or any combination of software, firmware, and/or hardware elements. In an embodiment, player 210 has one or more player tracks that control the output of a media track on a corresponding output port. For example, player track 212 controls the playout on output port 202. In one embodiment, configuration information 214 defines one or more attributes of player track 212. For example, configuration information 214 may define one or more configurable output port labels for output port 202. In an embodiment, automatic media track routing logic 230 (or, for ease of reference, routing logic 230) matches a configurable output port label to a media track identifier to automatically route the media track to output port 202. Configurable output port labels are further described below with reference to FIGS. 3-7. In one embodiment, a media server may have multiple instances of a player (e.g., media server 200 may include multiple instances of player 210).

A variety of administrative tools (e.g., track tool 120, network manager 122, and automation system 124, shown in FIG. 1) may interact with player 210 (and the other elements of media server 200) through network 204. Network 204 may include a broad range of wired and wireless networks including a local area network, a wide area network, and/or the Internet. Track driver 216 provides a driver to output media from player 210 to output port 202.

File system 250 provides access to media clips and other data stored in storage system 260. The accessed media clips are provided to player 210 through media layer 240. In an embodiment, a "wrapper" is used to encapsulate media tracks within a media clip. The wrapper provides references (e.g., pointers) to the various tracks that make up the media clip. For example, wrapper 252 contains references to video track 254 and audio tracks 256-258. The use of wrappers and references to specify the elements of a media clip provides a flexible way to organize media tracks within file system 250 and storage system 260.

Figure 3:
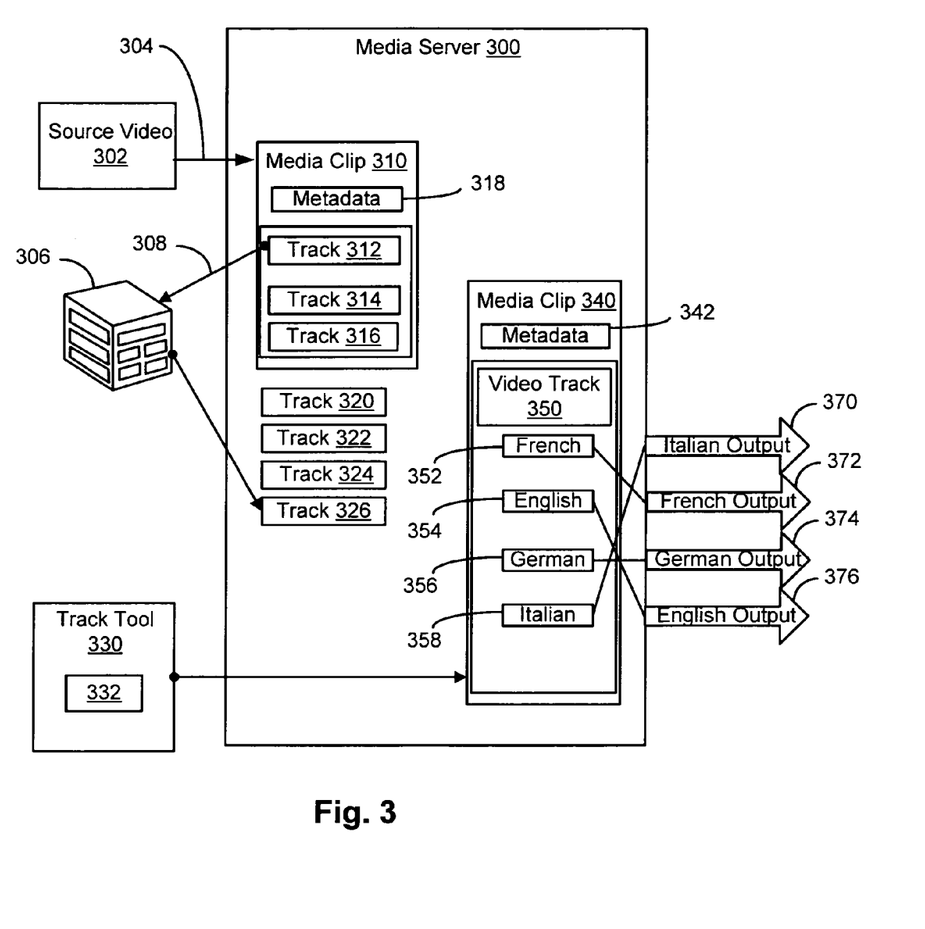
FIG. 3 is a simplified block diagram illustrating selected aspects of a media server, according to an embodiment of the invention.

FIG. 3 is a simplified block diagram illustrating selected aspects of media server 300 according to an embodiment of the invention. Source video 302 is ingested by media server 300 into media clip 310 as shown by 304. In an embodiment, video track 312 and audio tracks 314-316 are stored separately (e.g., in media layer 240 and/or storage system 260, shown in FIG. 2) and contained in media clip 310.

Media clip 310 also includes metadata 318. Metadata 318 contains attributes for media clip 310 and/or the media tracks (e.g., 312-316) contained by media clip 310. In one embodiment, metadata 318 includes one or more track identifiers for at least one of tracks 312-316. The track identifier can be any of a wide range of identifiers including user-defined text strings and/or characters defined by a standard. In one embodiment, a track identifier is based on a user-defined identification scheme. In an alternative embodiment in which a track identifier is used to identify a language track, the track identifier is a language label based, at least in part, on the International Organization for Standards (ISO) standard 639.2 titled, "Codes for the Representation of Names of Languages."

A low resolution copy of video track 312 is sent to audio house 306 as shown by 308. The copy of video track 312 may be sent using standard networking protocols such as File Transfer Protocol (FTP) or the Transmission Control Protocol/Internet Protocol (TCP/IP) protocols. Audio house 306 may be any of a wide range of third-party providers that generate audio tracks suitable for broadcast via media server 300. Audio house 306 returns audio tracks 320-326 to media server 300 using, for example, standard networking protocols. Track tool 330 creates media clip 340 by configuring metadata 342 so that it references media tracks 350-358. Media tracks 350-358 may be any combination of tracks 312-316, tracks 320-326, and/or other tracks (not shown) that are stored in a file system (e.g., file system 250, shown in FIG. 2) and/or a storage system (storage system 260, shown in FIG. 2). There is no need to layoff audio tracks 320-326 to a video track because track tool 330 can associate audio tracks 320-326 with media clip 310.

In an embodiment, track tool 330 includes track identifier editor 332. In the illustrated embodiment, track identifier editor 332 inserts track identifiers for tracks 352-358 into metadata 342. Routing logic (e.g., routing logic 230, shown in FIG. 2) uses the track identifiers to automatically route tracks 352-358 to an output port (e.g., output ports 370-376) having a matching configurable output port label. As illustrated in FIG. 3, each of tracks 352-358 is output on the appropriate output port regardless of the stacking order of tracks 352-358 within media clip 340.

Figure 4:
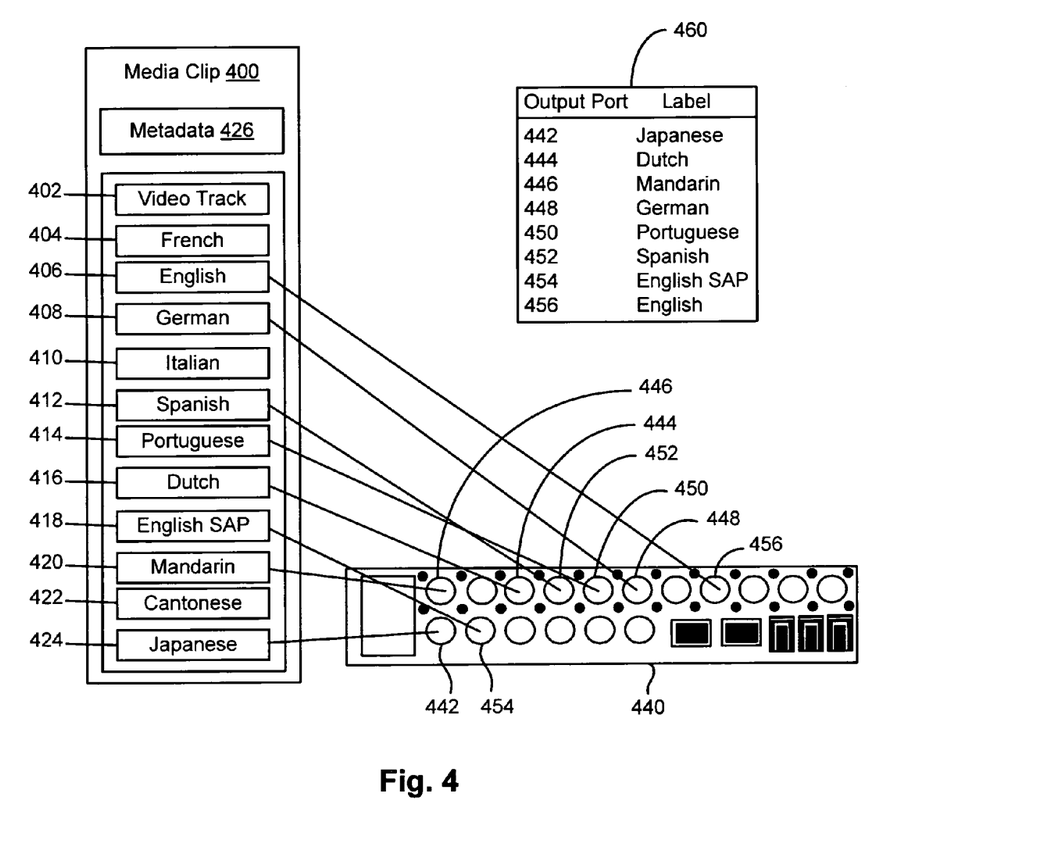
FIG. 4 is a block diagram illustrating correct output port assignments according to an embodiment of the invention.

FIG. 4 is a block diagram illustrating correct output port assignment according to an embodiment of the invention. In an embodiment, each output port has associated configuration information (e.g., 214, shown in FIG. 2) to specify one or more attributes for the output port. The configuration information includes one or more configurable output port labels for each output port. In an embodiment, a network manager (e.g., network manager 122, shown in FIG. 1) or other tool is used to set the configurable output port labels.

Media clip 400 includes video track 402 and audio tracks 404-424. Each of audio tracks 404-424 has a track identifier that specifies a language for the audio track. For ease of description, the track identifiers are shown within each audio track (e.g., French, English, German, etc.). In one embodiment, however the track identifiers are actually contained in metadata 426.

A rear-view of I/O ports 440 shows a number of output ports 442-456. At least some of the output ports 442-456 are identified by configurable output port labels. Routing logic (e.g., routing logic 230, shown in FIG. 2) automatically routes tracks 404-424 to the output port having a matching (or best fit) configurable output port label. For example, audio track 406 has a track identifier of "English" and is automatically routed to port 456 which has the matching configurable port label of "English." Table 460 shows which configurable output label is assigned to the corresponding output port.

Figure 5:
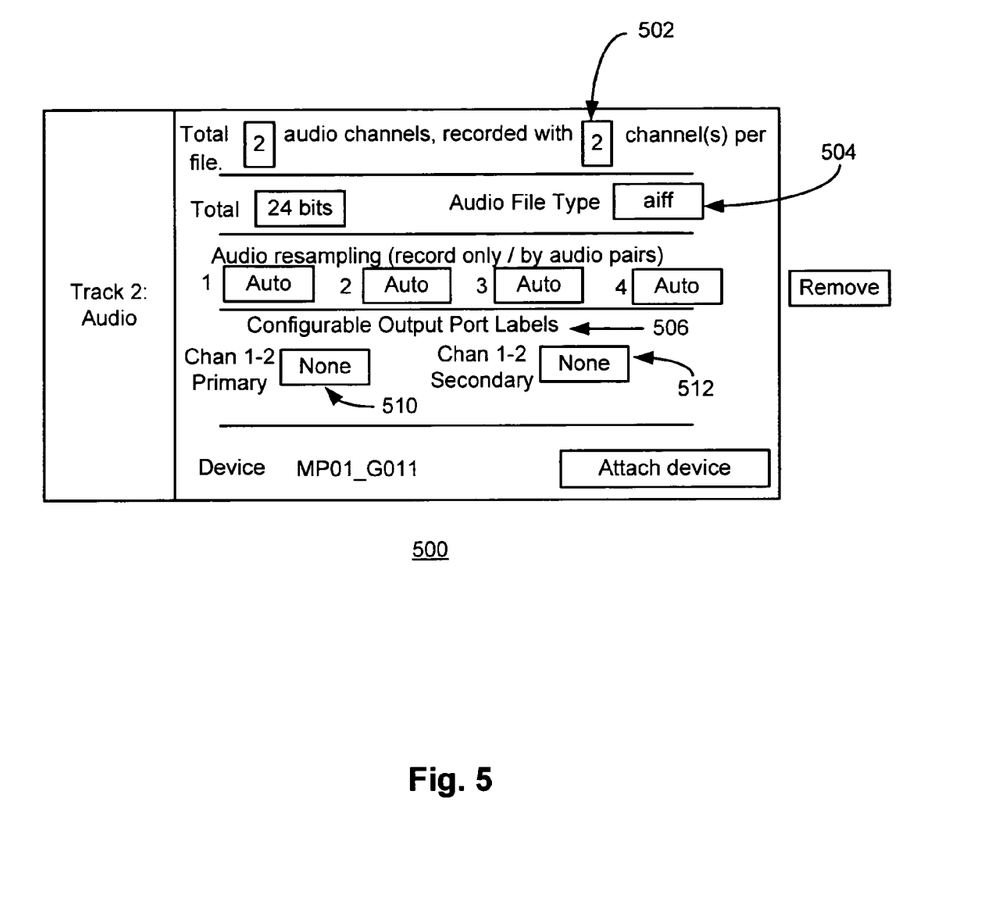
FIG. 5 is a block diagram of a Graphical User Interface (GUI) suitable for setting a configurable output port label according to an embodiment of the invention.

FIG. 5 is a block diagram of a Graphical User Interface (GUI) 500 suitable for setting a configurable output port label according to an embodiment of the invention. A user accesses GUI 500 from a tool such as network manager 122, shown in FIG. 1. The illustrated embodiment of GUI 500 is directed to setting attributes for an audio output port. For example, a user may specify the number of audio channels in a track played through the output port at 502 and an audio file type at 504.

In an embodiment, configurable output port labels section 506 allows a user to set one or more labels for an output port. For example, pull-down menu 510 allows a user to select a primary configurable output port label. The selections available in pull-down menu 510 can be based on almost any user-defined or standardized scheme. In addition, the selections available through pull-down menu 510 can be modified by altering the code that determines the make-up of GUI 500.

In one embodiment, each output port (or selected output ports) can have multiple configurable output port labels. Having multiple configurable output port labels allows routing logic (e.g., routing logic 230 shown in FIG. 2) to select alternative labels if a primary configurable output port label does not match an available media track. For example, pull-down menu 512 allows a user to set a secondary output port label for the port associated with GUI 500.

Figure 6:
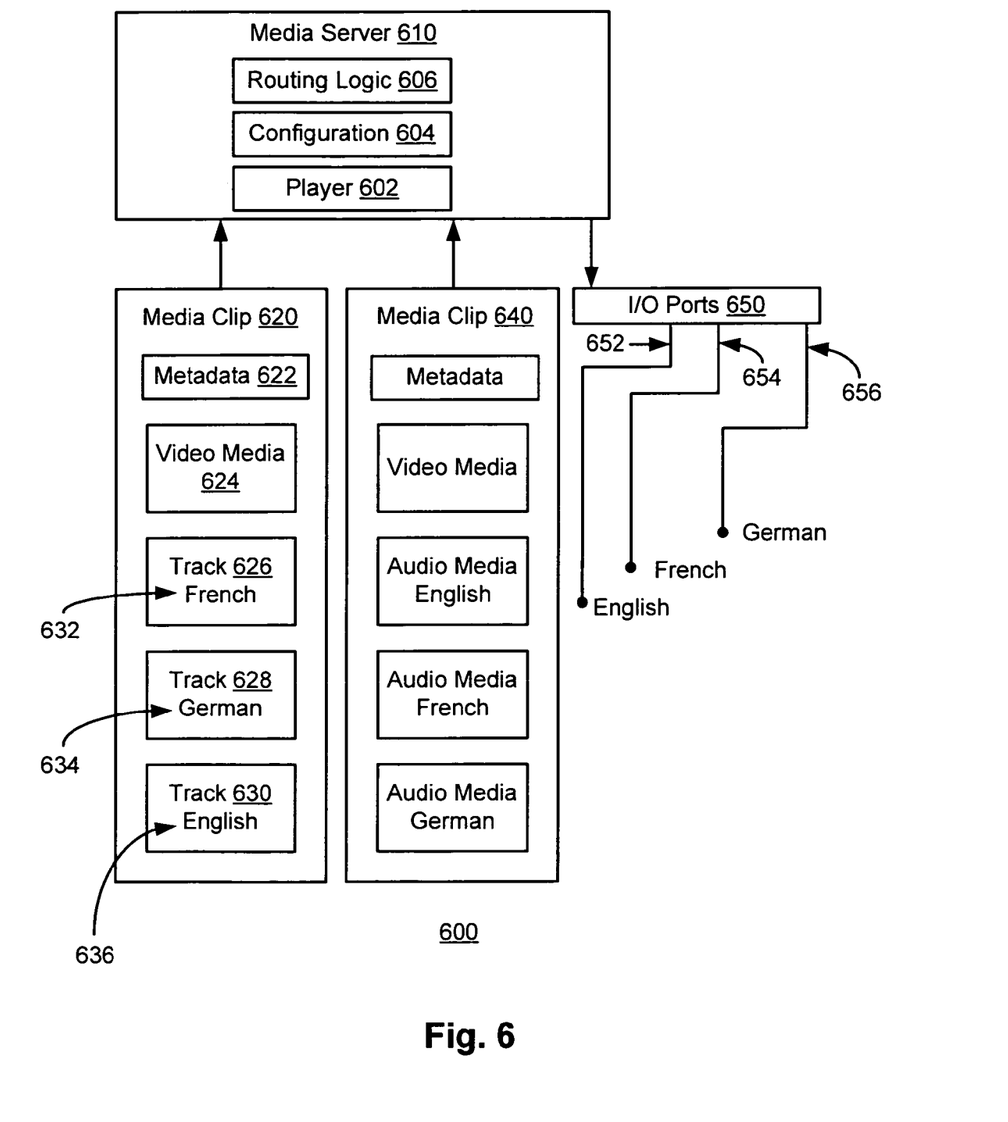
FIG. 6 is a block diagram of a system for automatically routing media tracks according to an embodiment of the invention.

FIG. 6 is a block diagram of a system 600 for automatically routing media tracks according to an embodiment of the invention. In one embodiment, an automation system (e.g., automation system 124, shown in FIG. 1) instructs player 602 to play a media clip (e.g., media clips 620 or 640). For example, the automation system can instruct player 602 to load media clip 620. In response, player 602 searches a file system (e.g., file system 250, shown in FIG. 2) to locate media clip 620. Player 602 then inspects metadata 622 to determine which tracks are contained within media clip 620.

In an embodiment, configuration information 604 specifies output port labels for I/O ports 650. For example, output ports 652, 654, and 656 are respectively labeled English, French, and German. Similarly, tracks 626-630 respectively have track identifiers 632-636. Routing logic 606 automatically selects tracks 626-630 based, at least on part, on a best match between track identifiers 632-636 and output port labels 652-656. The selected tracks 626-630 are mapped to the output port 652-656 having the best matching output port label. When the automation system instructs media server 610 to play media clip 620, tracks 626-630 are automatically played on output ports 652-656 according to the mapping.

Figure 7:
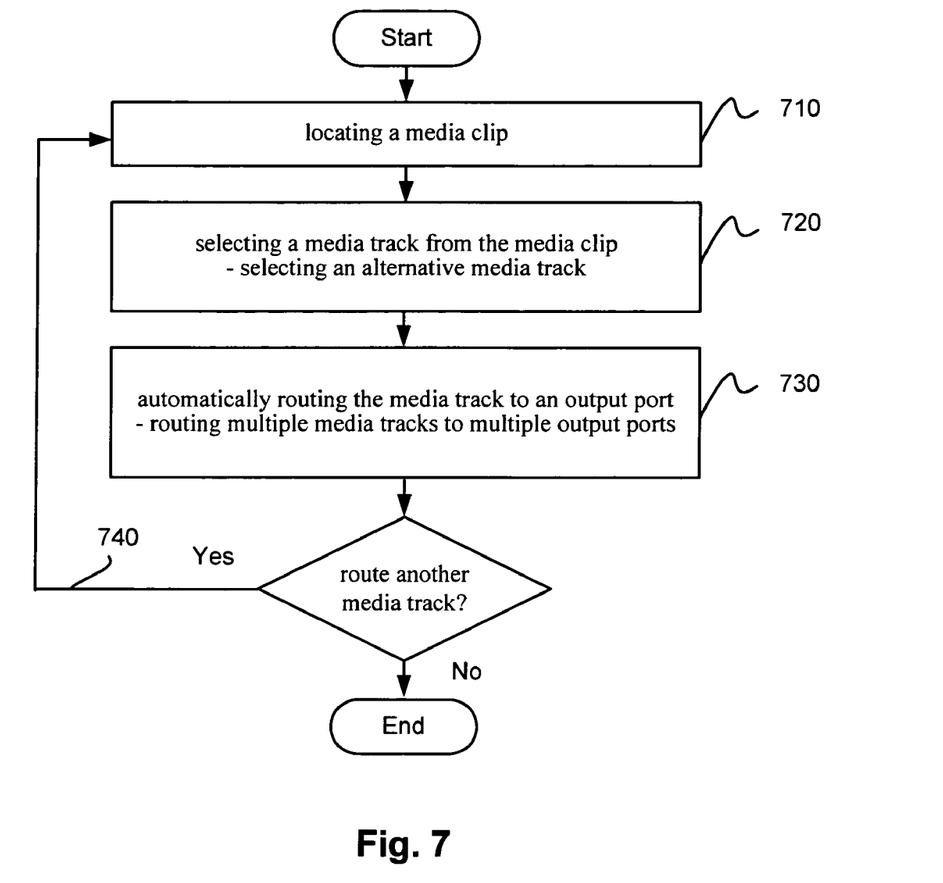
FIG. 7 is a flow diagram illustrating certain aspects of a method for automatically routing media tracks according to an embodiment of the invention.

Turning now to FIG. 7, the particular methods associated with embodiments of the invention are described in terms of computer software and hardware with reference to a flowchart. The methods to be performed by a computing device (e.g., a media server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for automatically routing media tracks according to an embodiment of the invention. Referring to process block 710 a player (e.g., player 602, shown in FIG. 6) locates a media clip. The media clip may be stored in a file system (e.g., file system 250, shown in FIG. 2) and/or in a storage system (e.g., storage system 260, shown in FIG. 2). Alternatively, the media clip may be provided to the player over a network (e.g., media clip 128, shown in FIG. 1).

Referring to process block 720, a media track is selected from the media clip based, at least in part, on a track identifier associated with the media track. The selected media track may be any kind of media track including a video or an audio track. The track identifier can be based on almost any user-defined or standardized identification scheme. In an embodiment, the track identifier is a language identifier. In such an embodiment, the language identifier may be based on ISO standard 639.2. In one embodiment, the player may select alternative media tracks if it cannot locate a media track having a particular media track identifier.

Referring to process block 730, the selected media track is automatically routed to an output port based on at least a partial match between the track identifier and a configurable output port label. In one embodiment, a media server (e.g., media server 610, shown in FIG. 6) has multiple output ports each having a configurable output port label. In such an embodiment, the player may route multiple media tracks to the multiple output port labels based on at least partial matches between media track identifiers and the configurable output port labels. The process may be repeated at 740.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for automatically routing a media track comprising:
   locating a media clip stored in a file system of a media server, wherein the media clip includes at least one media track;
   selecting a media track based, at least in part, on a track identifier associated with the media track;
   automatically routing the media track to an output port of the media server based, at least in part, on at least a partial match between the track identifier and a configurable output port label;
   wherein the track identifier is embedded in the media track;
   wherein the track identifier is a language identification code.

2. The method of claim 1, wherein the media track is one of: an audio track; and a video track.

3. The method of claim 1, wherein the track identifier is a text string.

4. The method of claim 1, further comprising:
   assigning the track identifier to the media track with a track identifier editor.

5. The method of claim 4, wherein assigning the track identifier to the media track comprises:
   accessing the media clip;
   selecting the media track based, at least in part, on metadata associated with the media clip; and
   adding the track identifier to metadata associated with the media clip.

6. The method of claim 1, further comprising:
   configuring the configurable output port label to at least partly match the track identifier.

7. The method of claim 6, wherein the media clip includes at least a first media track having a first track identifier and a second media track having a second track identifier.

8. The method of claim 7, wherein automatically routing the media track to an output port of the media server, comprises:
   automatically routing the first media track to a first output port of the media server based on at least a partial match between the first track identifier and a first configurable output port label; and
   automatically routing the second media track to a second output port of the media server based on at least a partial match between the second track identifier and a second configurable output port label.

9. The method of claim 8, wherein the first output port is configured for at least two configurable output port labels, including a first configurable output port label and a third configurable output port label; and further wherein automatically routing the first media track to the first output port of the media server comprises:
   automatically routing the first media track to the first output port of the media server if the first track identifier at least partly matches one of the first configurable output port label and the third configurable output port label.

10. A system comprising:
    an output port to provide media track playout, wherein the output port is associated with at least one configurable output port label;
    a configuration file to specify a configurable output port label;
    a media clip having at least one media track, wherein the media track is associated with a track identifier; and
    routing logic to automatically route the media track to the output port based on at least a partial match between the configurable output port label and the track identifier;
    wherein the track identifier is a language identification code.

11. The system of claim 10, wherein the media track is one of: an audio track;
    and a video track.

12. The system of claim 10, further comprising:
    a system management console to access the configuration file.

13. The system of claim 10, wherein the media clip includes at least a first media track having a first track identifier and a second media track having a second track identifier; and further wherein the routing logic is to:
- automatically route the first media track to a first output port based on at least a partial match between the first track identifier and a first configurable output port label; and
- automatically route the second media track to a second output port based on at least a partial match between the second track identifier and a second configurable output port label.

14. An article of manufacture comprising an electronically accessible medium providing instructions that, when executed by an apparatus, cause the apparatus to:
- locate a media clip stored in a file system of a media server, wherein the media clip includes at least one media track;
- select a media track based, at least in part, on a track identifier associated with the media track;
- automatically route the media track to an output port of the media server based on at least a partial match between the track identifier and a configurable output port label;
- wherein the track identifier is embedded in the media track;
- wherein the track identifier is a language identification code.

15. The article of manufacture of claim 14, wherein the media track is one of:
an audio track; and a video track.

16. The article of manufacture of claim 14, wherein the electronically accessible medium provides further instructions that, when executed by the apparatus, cause the apparatus to:
- assign the track identifier to the media track with a track identifier editor.

17. The article of manufacture of claim 16, wherein the instructions that, when executed by the apparatus, cause the apparatus to assign the track identifier to the media track cause the apparatus to:
- access the media clip;
- select the media track based, at least in part, on metadata associated with the media clip; and
- add the track identifier to the metadata associated with the media clip.

18. The article of manufacture of claim 14, wherein the electronically accessible medium provides further instructions that, when executed by the apparatus, cause the apparatus to:
- configure the configurable output port label to at least partly match the track.

* * * * *